United States Patent
Lee

(10) Patent No.: US 10,189,499 B2
(45) Date of Patent: Jan. 29, 2019

(54) STEERING CONTROL APPARATUS AND STEERING CONTROL METHOD

(71) Applicant: Mando Corporation, Pyeongtaek-si, Gyeonggi-do (KR)

(72) Inventor: Sung Gun Lee, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 262 days.

(21) Appl. No.: 15/257,913

(22) Filed: Sep. 7, 2016

(65) Prior Publication Data

US 2017/0066477 A1 Mar. 9, 2017

(30) Foreign Application Priority Data

Sep. 7, 2015 (KR) .................... 10-2015-0126192

(51) Int. Cl.
*B62D 6/00* (2006.01)
*B62D 6/02* (2006.01)
*B62D 6/10* (2006.01)

(52) U.S. Cl.
CPC ............. *B62D 6/10* (2013.01); *B62D 6/003* (2013.01); *B62D 6/008* (2013.01); *B62D 6/02* (2013.01)

(58) Field of Classification Search
CPC . B62D 6/10; B62D 6/008; B62D 6/02; B62D 6/003
See application file for complete search history.

(56) References Cited

U.S. PATENT DOCUMENTS

| | | | | | |
|---|---|---|---|---|---|
| 5,907,277 | A | * | 5/1999 | Tokunaga | B62D 5/0463 180/412 |
| 5,992,557 | A | * | 11/1999 | Nakamura | B62D 5/0463 180/443 |
| 2008/0142293 | A1 | * | 6/2008 | Goto | B62D 6/003 180/446 |
| 2010/0114431 | A1 | * | 5/2010 | Switkes | B60T 8/17557 701/41 |
| 2017/0021731 | A1 | * | 1/2017 | Suzuki | B60L 7/26 |
| 2017/0210414 | A1 | * | 7/2017 | Sato | B60W 30/045 |

FOREIGN PATENT DOCUMENTS

KR 20080093602 A 10/2008

OTHER PUBLICATIONS

Machine Translation of KR 2008-0093602 retrieved from Espacenet on Jul. 23, 2016 (Year: 2018).*
Chinese Office Action dated May 28, 2018 in connection with the counterpart Chinese Patent Application No. 201610806773.8.

* cited by examiner

Primary Examiner — Thomas Ingram
(74) Attorney, Agent, or Firm — Hauptman Ham, LLP

(57) ABSTRACT

The present invention relates to a steering control apparatus comprising: a sensing unit configured to sense at least one among a vehicle speed, a steering angle, first lateral acceleration, and a steering angle speed; an estimation unit configured to estimate second lateral acceleration on the basis of the vehicle speed and the steering angle; and a controller configured to control a steering device so that a steering torque increases, on the basis of a slip gradient which indicates a difference between the first lateral acceleration and the second lateral acceleration, wherein the controlling of the steering device is released when the steering angle speed is inverted.

8 Claims, 16 Drawing Sheets

STEERING CONTROL APPARATUS AND STEERING CONTROL METHOD

CROSS REFERENCE TO RELATED APPLICATION

This application claims priority from Korean Patent Application No. 10-2015-0126192, filed on Sep. 7, 2015, which is hereby incorporated by reference for all purposes as if fully set forth herein.

BACKGROUND OF THE INVENTION

1. Field of the Invention

The present embodiments relate to a steering control technology.

2. Description of the Prior Art

When a driver steers a steering device while a vehicle travels, a tire may curvedly travel while slipping on the ground.

The center line of the tire and the traveling direction of the tire become different from each other according to such slipping. Further, a tire ground contact surface may increase in one direction. The one direction refers to a direction different from the traveling direction of the tire with reference to the center line of the tire.

A self-aligning torque, which tends to restore the tire to an original form in the center of the tire, is generated by the tire ground contact surface which has increased in one direction.

In other words, the driver should provide force against the self-aligning torque in order to steer the steering device.

Whereas, the self-aligning torque is dependent on a slip angle which is an angle formed by the center line of a tire and the traveling direction of the tire.

However, the self-aligning torque tends to increase in proportion to the slip angle up to a particular slip angle, but decrease at a slip angle above the particular slip angle.

Owing to such a tendency, when a driver provides force against the self-aligning torque to steer a steering device and thereby the slip angle of a vehicle exceeds the particular slip angle, the driver may unintentionally oversteer the steering device.

SUMMARY OF THE INVENTION

In this background, the purpose of the present embodiments is to provide a steering control technology which prevents the slip angle of a vehicle from exceeding a particular slip angle when a driver steers a steering device.

In one aspect, the present embodiment provides a steering control apparatus including: a sensing unit configured to sense at least one among a vehicle speed, a steering angle, first lateral acceleration, and a steering angle speed; an estimation unit configured to estimate second lateral acceleration on the basis of the vehicle speed and the steering angle; and a controller configured to control a steering device so that a steering torque increases, on the basis of a slip gradient which indicates a difference between the first lateral acceleration and the second lateral acceleration, wherein the controller releases the controlling of the steering device when the steering angle speed is inverted.

In another aspect, the present embodiment provides a steering control method including: a sensing step of sensing at least one among a vehicle speed, a steering angle, first lateral acceleration, and a steering angle speed; an estimation step of estimating second lateral acceleration on the basis of the vehicle speed and the steering angle; and a control step of controlling a steering device so that a steering torque increases, on the basis of a slip gradient which indicates a difference between the first lateral acceleration and the second lateral acceleration, wherein the controlling of the steering device is released when the steering angle speed is inverted.

As described above, the present embodiments can provide a steering control technology which prevents the slip angle of a vehicle from exceeding a particular slip angle when a driver steers a steering device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1A:
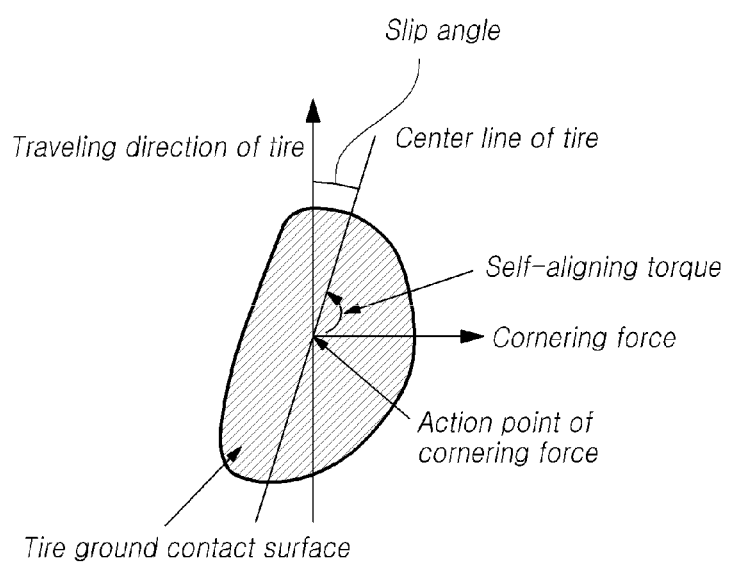
FIG. 1A is a view illustrating the relationship between the slipping of a tire ground contact surface and force.

Hereinafter, some embodiments will be described in detail with reference to the accompanying drawings. In adding reference numerals to elements in each drawing, the same elements will be designated by the same reference numerals, if possible, although they are shown in different drawings. Further, in the following description of the present embodiment, a detailed description of known functions and configurations incorporated herein will be omitted when it is determined that the description may make the subject matter of the technical idea of the present invention unclear.

In addition, terms, such as first, second, A, B, (a), (b) or the like may be used herein when describing elements of the present embodiment. These terms are merely used to distinguish one element from other elements, and a property, an order, a sequence and the like of a corresponding element are not limited by the terms. It should be noted that if it is described in the specification that one element is "connected," "coupled" or "joined" to another element, a third element may be "connected," "coupled," and "joined" between the first and second elements, although the first elements may be directly connected, coupled or joined to the second element.

Figure 1B:
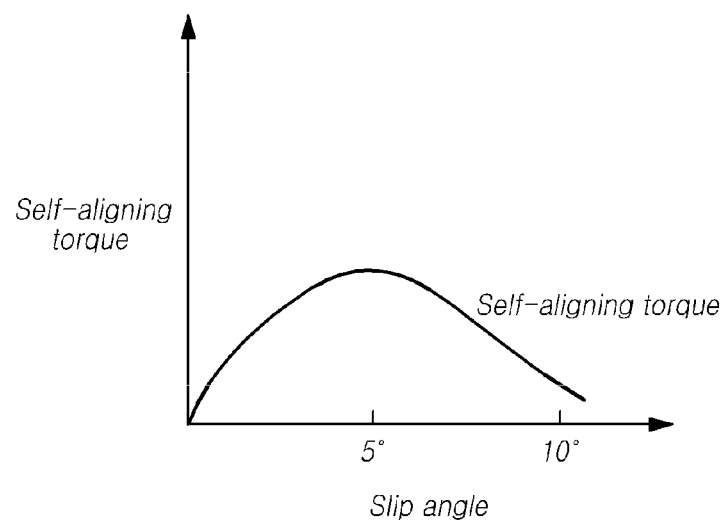
FIG. 1B illustrates a change in a self-aligning torque and slip angle in a situation of FIG. 1A.

FIG. 1A illustrates the relationship between the slipping of a tire ground contact surface and force, and FIG. 1B exemplarily illustrates a change in a self-aligning torque and slip angle in a situation of FIG. 1A.

When a driver steers a steering device to the right side of the traveling direction of a vehicle, force may act on a tire as in FIG. 1A.

Referring to FIG. 1A, when the steering device is steered by the driver, the tire may have a tire traveling direction different from the center line of the tire while slipping. In this situation, an angle formed by the center line of the tire and the tire traveling direction is referred to as a slip angle, and the tire ground contact surface may increase in one direction by the above-described slipping. The one direction refers to a direction different from the traveling direction of the tire with reference to the center line of the tire.

Further, force, which is formed in a direction perpendicular to the traveling direction of the tire, is referred to as cornering force, and force, which attempts to restore the tire to an original form at the center of the tire, is referred to as a self-aligning torque (SAT).

In a situation of FIG. 1A, the self-aligning torque may increase, as in FIG. 1B, at a slip angle up to 5 degrees but may sharply decrease at a slip angle above 5 degrees. This is one example and there may be partial differences according to the state of a tire, the state of a road surface, or the weight of a vehicle.

According to FIG. 1B, when the driver excessively steers the steering device to form the slip angle of 5 degrees or more, the self-aligning torque decreases sharply and thereby the driver may unintentionally oversteer the steering device.

For example, when the driver provides force of 12[N] to steer a vehicle (of which the self-aligning torque is 10[N]) traveling at a slip angle of 5 degrees, the steering device may be steered by force of 2[N]. When the slip angle increases in this situation and the vehicle (of which the self-aligning torque is 7[N]) travels at a slip angle of 7 degrees, the steering device may be steered by force of 5[N]. In this case, the driver may feel a sense of improper steering due to the sudden decrease of steering reaction force and there may be a problem in controlling a vehicle behavior control. In the present specification, a description will be made by referring to, as a steering torque, steering reaction force resulting from steering a steering wheel by the driver. In other words, the driver steers the steering wheel by a predetermined level of force. This force may be changed according to steering reaction force and the steering reaction force is described as steering torque in the present specification. Therefore, steering torque may be, as needed, used with the same meaning as steering reaction force.

Hereinafter, the steering control apparatus of the present embodiment, which can solve the above-described problems, will be described using FIGS. 2 to 13.

Figure 2:
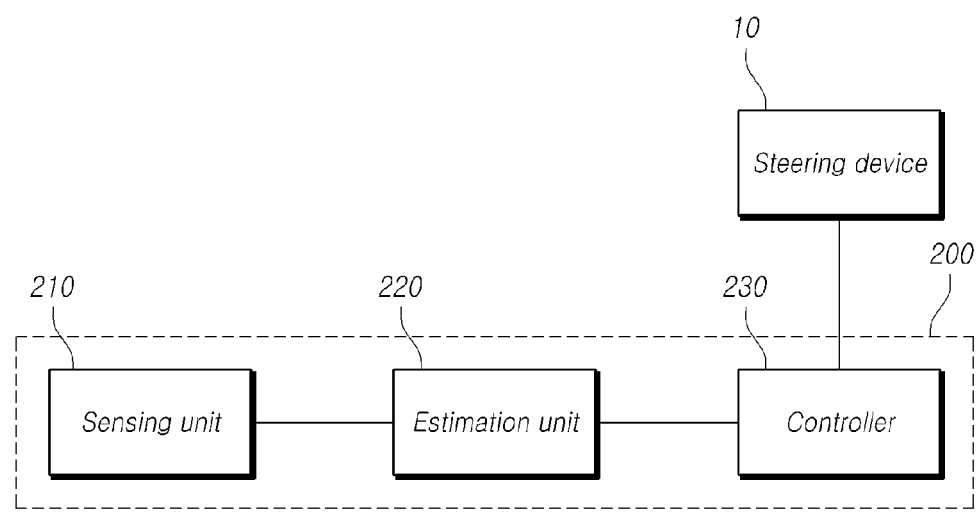
FIG. 2 illustrates a configuration of a steering control apparatus according to a first embodiment.
Figure 3:
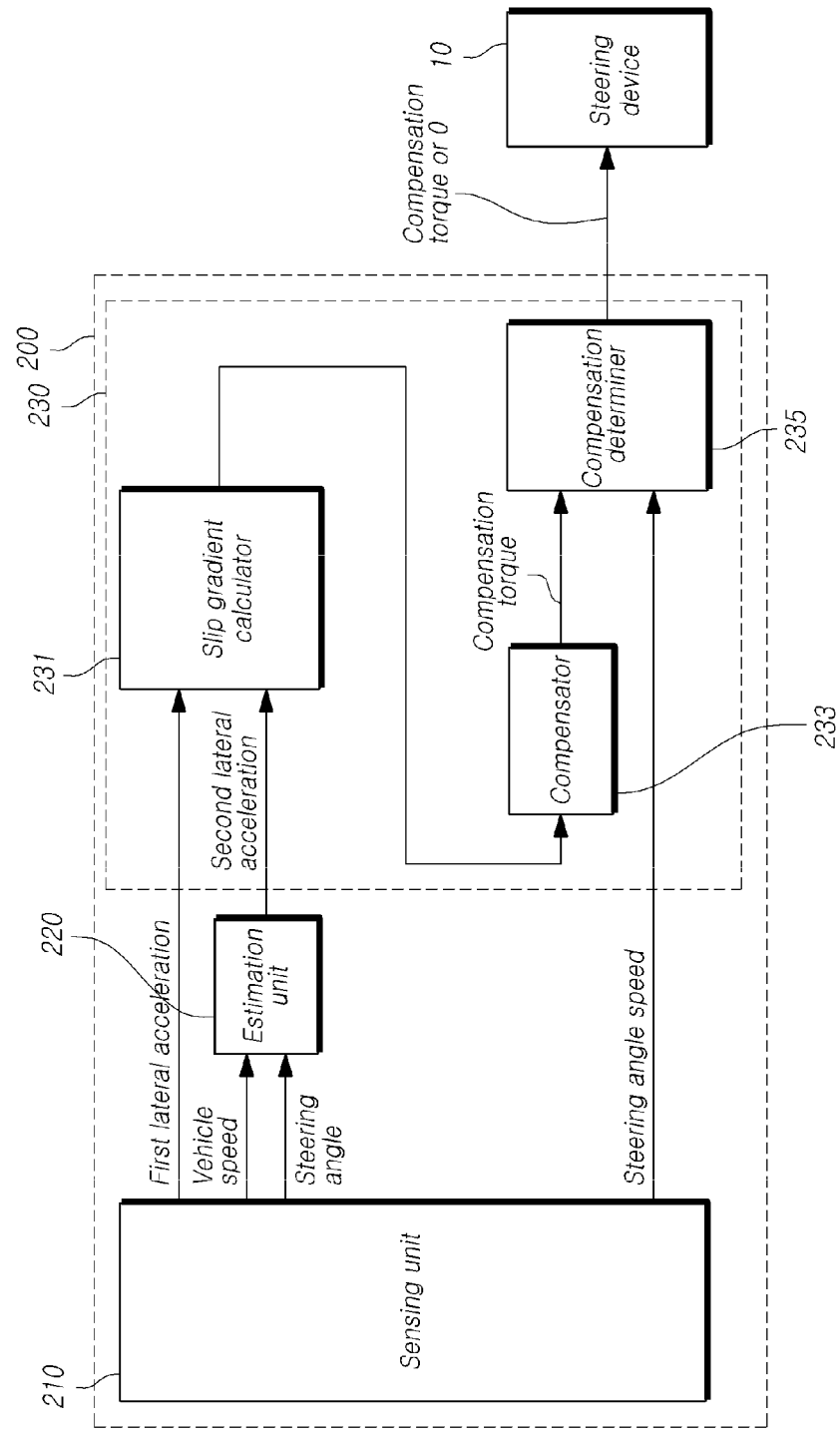
FIG. 3 illustrates one example for describing an operation of a steering control apparatus according to a first embodiment.
Figure 4A:
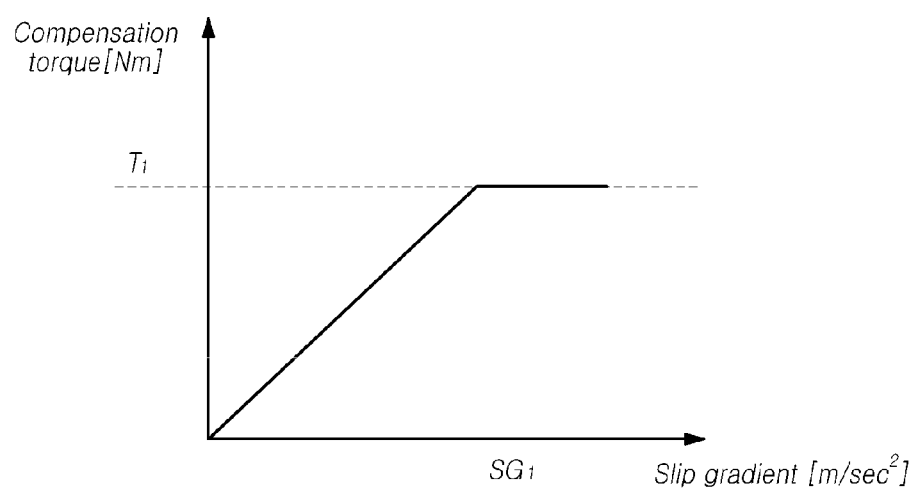
FIG. 4A illustrates one example for describing an operation of a controller according to a first embodiment.
Figure 4B:
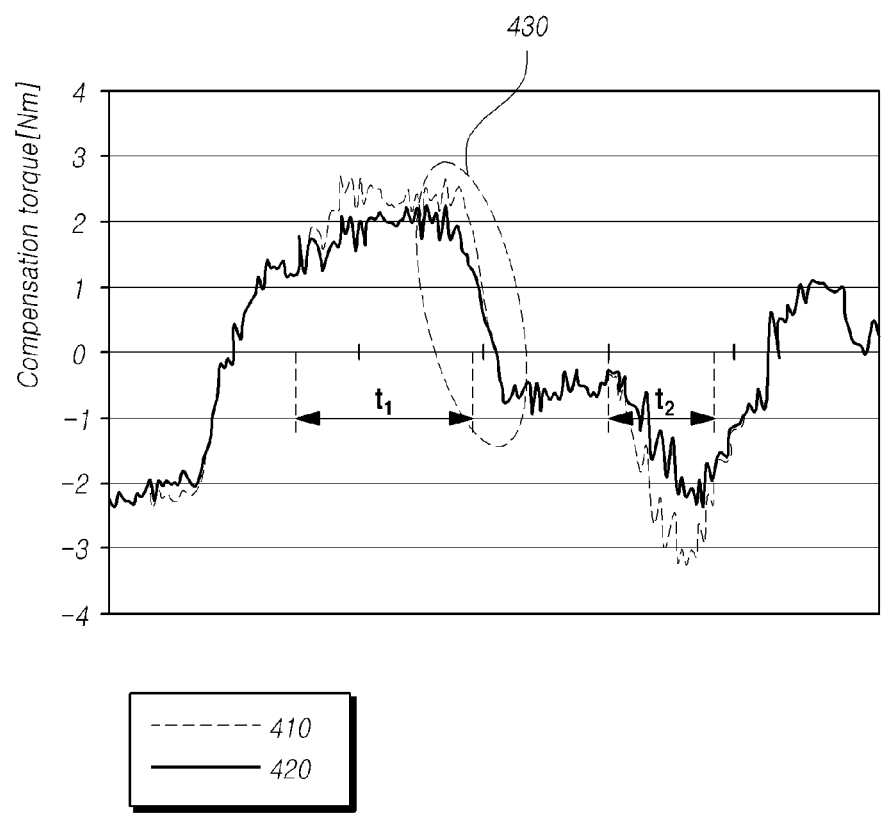
FIG. 4B illustrates another example for describing an operation of a controller according to a first embodiment.

FIG. 2 illustrates a configuration of a steering control apparatus according to a first embodiment; FIG. 3 illustrates one example for describing an operation of a steering control apparatus according to a first embodiment; FIG. 4A illustrates one example for describing an operation of a controller according to a first embodiment; and FIG. 4B illustrates another example for describing an operation of a controller according to a first embodiment.

Referring to FIG. 2, a steering control apparatus 200 according to the first embodiment may include: a sensing unit 210 configured to sense at least one among a vehicle speed, a steering angle, first lateral acceleration, and a steering angle speed; an estimation unit 220 configured to estimate second lateral acceleration on the basis of the vehicle speed and the steering angle; and a controller 230 configured to control a steering device so that a steering torque increases, on the basis of a slip gradient which indicates a difference between the first lateral acceleration and the second lateral acceleration, wherein the controller 230 releases the controlling of the steering device when the steering angle speed is inverted.

The sensing unit 210 may sense, using at least one sensor installed in a vehicle, a vehicle speed which is the moving speed of the vehicle, a steering angle formed by a steering device operated by a driver and a steering angle speed according thereto, and first lateral acceleration which is lateral acceleration acting on a cornering vehicle.

The estimation unit 220 may estimate second lateral acceleration ($a_y$) by applying the vehicle speed and the steering angle, which have been sensed by the sensing unit 210, to Equation 1 which is a cornering equation of a bicycle model.

$$a_y = \frac{\frac{V^2}{57.3Lg}}{1+\frac{KV^2}{57.3Lg}}\delta = \frac{\frac{V^2}{57.3Lg}}{1+\frac{KV^2}{57.3Lg}}(R_t \times \text{Steering Angle}) \quad \text{[Equation 1]}$$

Herein, Rt refers to a steering ratio (ratio between the steering angle of a tire and the steering angle of a steering wheel), V refers to a vehicle speed, L refers to a wheelbase which is the distance between a front wheel and a rear wheel, g refers to gravitational acceleration, and K refers to a constant which is $$\frac{W_f}{C_{af}} - \frac{W_r}{C_{ar}},$$

wherein $W_f$ refers to the weight of a front wheel, $C_{af}$ refers to the stiffness of a front wheel, $W_r$ refers to the weight of a rear wheel, and $C_{ar}$ refers to the stiffness of a rear wheel.

Equation 1 may be calculated on the basis of the dynamic relationship between a vehicle at a particular time and the vehicle when a predetermined time has passed from the particular time. The controller 230 defines, as a slip gradient, a difference between the first lateral acceleration sensed by the sensing unit 210 and the second lateral acceleration estimated by the estimation unit 220 and controls a steering device 10 so that a steering torque increases, on the basis of the slip gradient, wherein the controller 230 may release the controlling of the steering device 10 when the steering angle speed sensed by the sensing unit 210 is inverted (changed from a positive value to a negative value or changed from a negative value to a positive value).

The steering torque may mean a torque required to operate the steering device 10. Therefore, the controller 230 may output a compensation torque proportionate to a slip gradient to control the steering device 10 so that the steering torque increases, thereby limiting the increase of the steering angle. In this case, the compensation torque may act in a direction opposite to a driver torque by which a driver operates a steering wheel. In other words, the controller 230 may output the compensation torque in a direction opposite to a steering wheel operation torque (e.g. driver torque) of a driver according to a slip gradient so as to control the steering reaction force, which the driver feels, to increase. Further, the controller 230 may decrease the amount of a compensation torque according to a slip gradient so as to control the steering reaction force, which the driver feels, to increase. For example, in generating a compensation torque in order to assist a driver torque of the driver, the controller 230 may provide a compensation torque lower than a compensation torque in a general situation to control the steering reaction force which a driver feels to increase. In conclusion, the controller 230 controls a steering torque (e.g. steering reaction force) to increase, and, in this case, even when a driver operates a steering wheel by the same torque, the change amount of a steering angle becomes less than that in a general situation.

The slip gradient may correspond to the slip angle described in FIG. 1A, and limiting the increase of a steering angle by the controller 230 may be for the purpose of limiting the increase of a slip angle in FIG. 1B so as to maintain a self-aligning torque.

Referring to FIG. 3, the sensing unit 210 may sense a vehicle speed, a steering angle, first lateral acceleration, and a steering angle speed; and the estimation unit 220 may input the vehicle speed and steering angle sensed by the sensing unit 210 into Equation 1 described above to estimate a second lateral acceleration.

Thereafter, a slip gradient calculator 231 of the controller 230 may receive an input of the first lateral acceleration sensed by the sensing unit 210 and the second lateral acceleration estimated by the estimation unit 220, and then may calculate a slip gradient. The slip gradient may be defined as a difference between the first lateral acceleration and the second lateral acceleration.

Then, a compensator 233 of the controller 230 may receive an input of a slip gradient output by the slip gradient calculator 231 and then output a compensation torque.

The compensation torque output by the compensator 233 is a factor which controls the slip gradient to be 0 or a set value, and may be proportionate to the size of the slip gradient.

Thereafter, a compensation determiner 235 may receive an input of the compensation torque and the steering angle speed sensed by the sensing unit 210 and then determine whether to input the compensation torque to a steering device according to a condition of the steering angle speed.

For example, when the steering angle speed is not inverted (changed from a positive value to a negative value or changed from a negative value to a positive value), the compensation determiner 235 may input the compensation torque received from the compensator 233 to the steering device 10. This may increase a steering torque of the steering device 10, thereby limiting the increase of steering angle. Herein, the limiting of the increase of the steering angle may mean preventing a driver from easily steering the steering device so that the traveling rotation angle of a vehicle does not increase.

In contrast, when the steering angle speed is inverted, the compensation determiner 235 may input 0 to the steering device 10.

Specifically, the inversion of the steering angle speed may mean the decrease of the traveling rotation angle of the vehicle. Therefore, when the steering angle speed is inverted, the slip angle of FIG. 1B does not increase any longer and therefore the controller 230 may input 0 to the steering device 10 so that the steering torque does not increase.

Referring to FIG. 4A, the controller according to a first embodiment may output a compensation torque proportionate to a slip gradient to control a steering device so that a steering torque increases, thereby limiting the increase of a steering angle. However, the controller may fix a compensation torque to a first compensation torque $T_1$ in a slip gradient equal to or larger than a first slip gradient $SG_1$. The steering torque may be determined in proportion to a compensation torque input to the steering device. Therefore, the increase of the compensation torque may refer to the increase of the steering torque.

The first slip gradient $SG_1$ may be set on the basis of data acquired through experiments based on a vehicle tire condition and a road surface condition, and the first compensation torque $T_1$ may be determined according to the set first slip gradient $SG_1$ and the setting of a compensator of the controller.

FIG. 4B illustrates a column torque 410 of a general steering control apparatus in a time domain including some time intervals $t_1$ and $t_2$ in which a slip gradient exists and a column torque 420 by a steering control apparatus according to the first embodiment.

Referring to FIG. 4B, the controller according to the first embodiment may control a steering device so that a steering torque increases, on the basis of the slip gradient, and may release the controlling of the steering device when the steering angle speed is inverted (430).

Owing to the function of releasing the controlling of the steering device, the column torque 420 of the steering control apparatus according to the first embodiment matches the column torque 410 of the general steering control apparatus, and thus a driver may steer the steering device with a feeling identical to an ordinary feeling. This may be a result of inputting, to the steering device, 0 output by the compensation determiner of the controller.

Unlike FIG. 4B, if there is no function of releasing the controlling of the steering device when the steering angle speed is inverted, the column torque of the steering control apparatus according to the first embodiment is different from the column torque of the general steering control apparatus even when the steering angle speed is inverted, and thereby the driver should provide larger force to steer the steering device. This may be a result of inputting, to the steering device, the compensation torque output by the compensator of the controller.

Further, as identified in FIG. 4B, a control may be performed so that the column torque 420 of the steering control apparatus according to the first embodiment is smaller than the column torque 410 of the general steering control apparatus in time intervals $t_1$ and $t_2$ in which the slip gradient exists (so that the steering torque increases), thereby making the driver provide larger force to steer the steering device. In other words, the increase of the steering angle may be limited.

For convenience of understanding, a description will be omitted of elements and operations identical or similar to the above-described elements and operations of the first embodiment, among some elements and some operations of each of a steering control apparatus according to a second embodiment, a steering control apparatus according to a third embodiment, and a steering control apparatus according to a fourth embodiment described before. The elements or operations of the above-described first embodiment may be applied to the omitted elements or operations.

Figure 5:
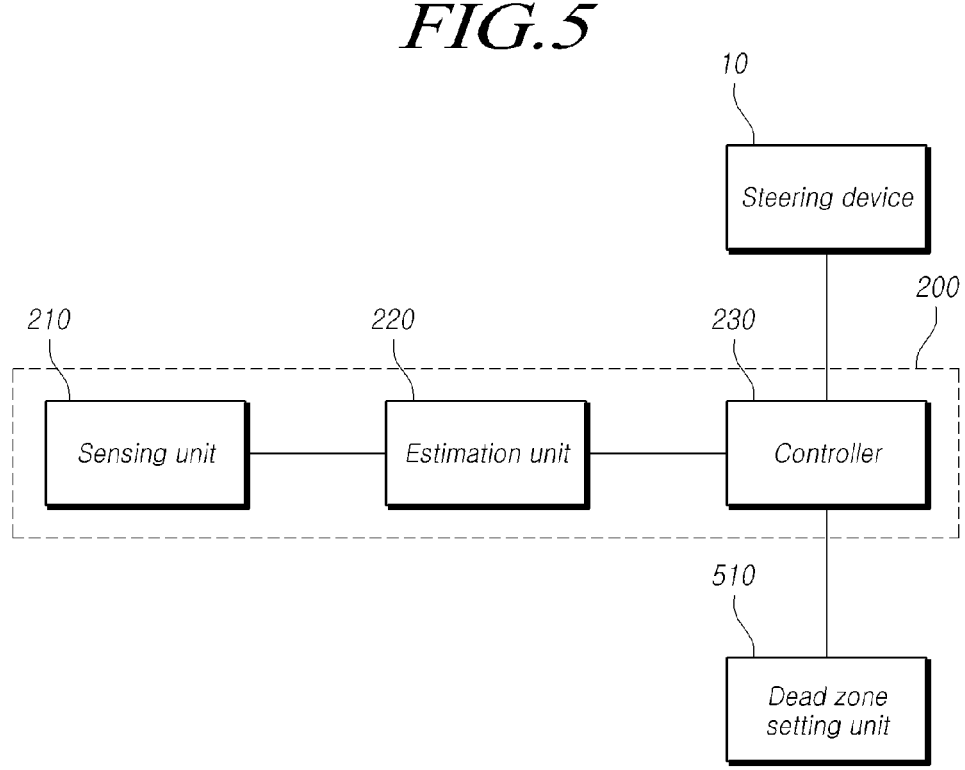
FIG. 5 illustrates a configuration of a steering control apparatus according to a second embodiment.
Figure 6:
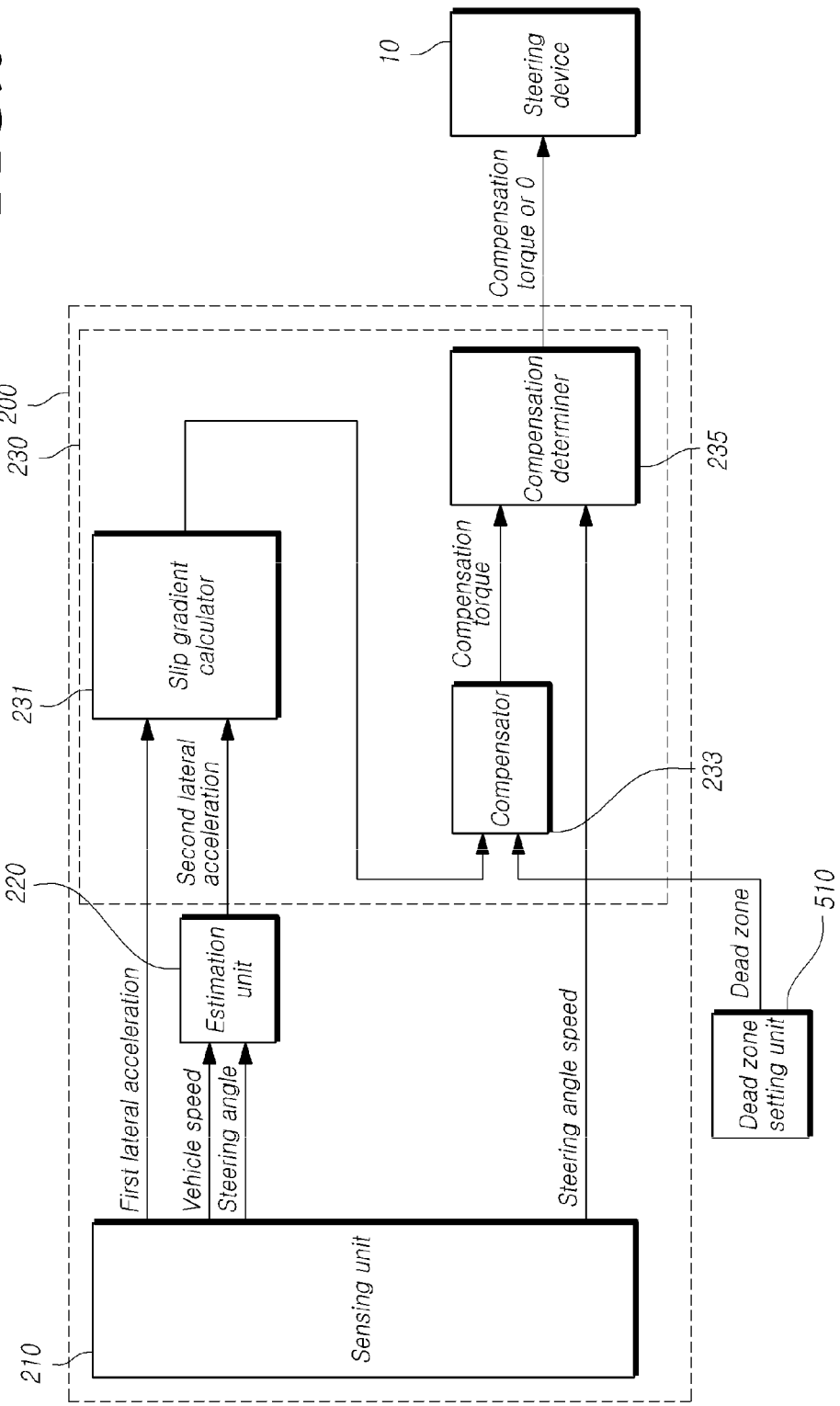
FIG. 6 illustrates one example for describing an operation of a steering control apparatus according to a second embodiment.
Figure 7:
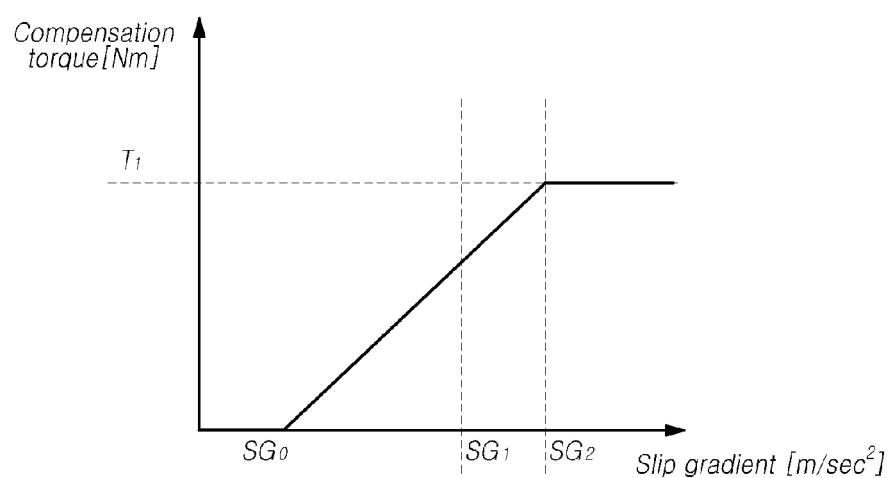
FIG. 7 illustrates one example for describing an operation of a controller according to a second embodiment.

FIG. 5 illustrates a configuration of a steering control apparatus according to a second embodiment; FIG. 6 illustrates one example for describing an operation of a steering control apparatus according to the second embodiment; and FIG. 7 illustrates one example for describing an operation of a controller according to the second embodiment.

Referring to FIG. 5, the steering control apparatus according to the second embodiment may further include a dead zone setting unit 510 that sets a dead zone in which the calculated slip gradient is from 0 to a predetermined value, in the steering control apparatus 200 according to the first embodiment described above.

Therefore, the controller 230 of the steering control apparatus according to the second embodiment may control the steering device so that the steering torque increases only when the slip gradient, which is a difference between the first lateral acceleration sensed by the sensing unit 210 and the second lateral acceleration estimated by the estimation unit 220, is larger than a predetermined value which is the maximum value of the dead zone.

Referring to FIG. 6, the steering control apparatus according to the second embodiment may further input a dead zone (a zone in which a value of the slip gradient is from 0 to a predetermined value) output by the dead zone setting unit 510 to the compensator 233 of the steering control apparatus 200 according to the first embodiment. Therefore, the compensator 233 may output a compensation torque that compensates for a slip gradient received from the slip gradient calculator 231 only when the slip gradient corresponds to a zone other than the dead zone.

Referring to FIG. 7, when the dead zone setting unit sets a zone from 0 [m/sec$^2$] to SG$_0$ [m/sec$^2$] as a dead zone, the controller controls the steering device so that a compensation torque is to be 0 within the set dead zone. In contrast, in a zone other than the set dead zone, the controller may output a compensation torque proportionate to the slip gradient to controls the steering device so that the steering torque increases, thereby limiting the increase of a steering angle.

When the steering control apparatus according to the second embodiment is the same as the steering control apparatus according to the first embodiment in conditions other than whether there is the dead zone setting unit 510, the bent line in FIG. 7 may be the same as a bent line obtained by translating the bent line in FIG. 4A by a predetermined value (SG$_0$) along the slip gradient axis. Therefore, in FIG. 7, a second slip gradient SG$_2$, in which the compensation torque is a first compensation torque T$_1$, may be equal to the sum of a first slip gradient SG$_1$ and the predetermined value SG$_0$.

Figure 8:
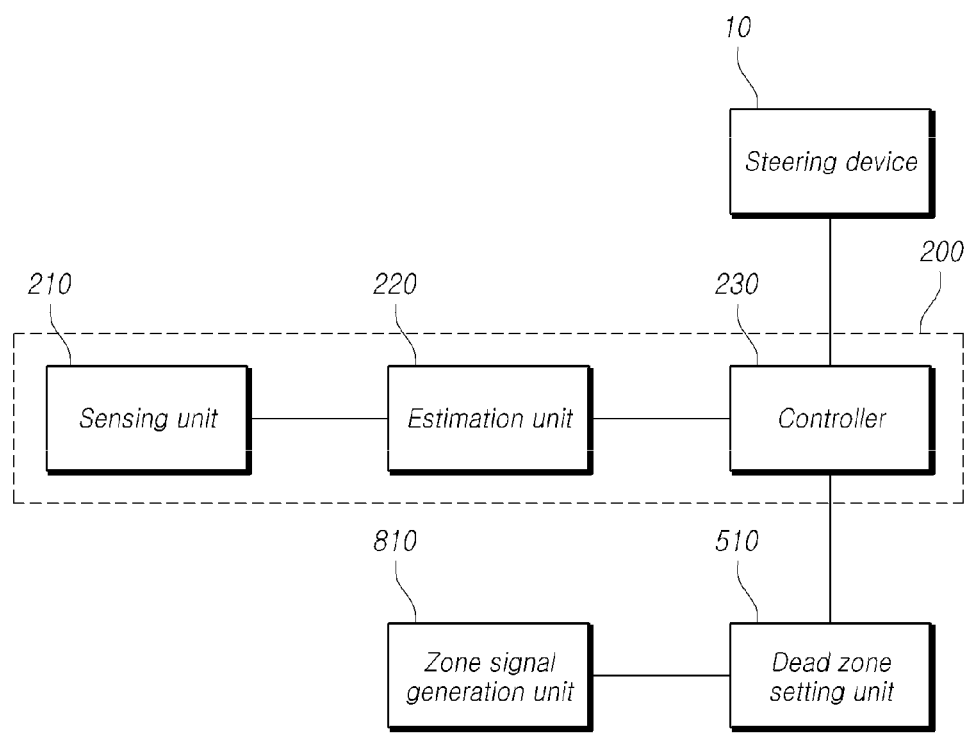
FIG. 8 illustrates a configuration of a steering control apparatus according to a third embodiment.
Figure 9:
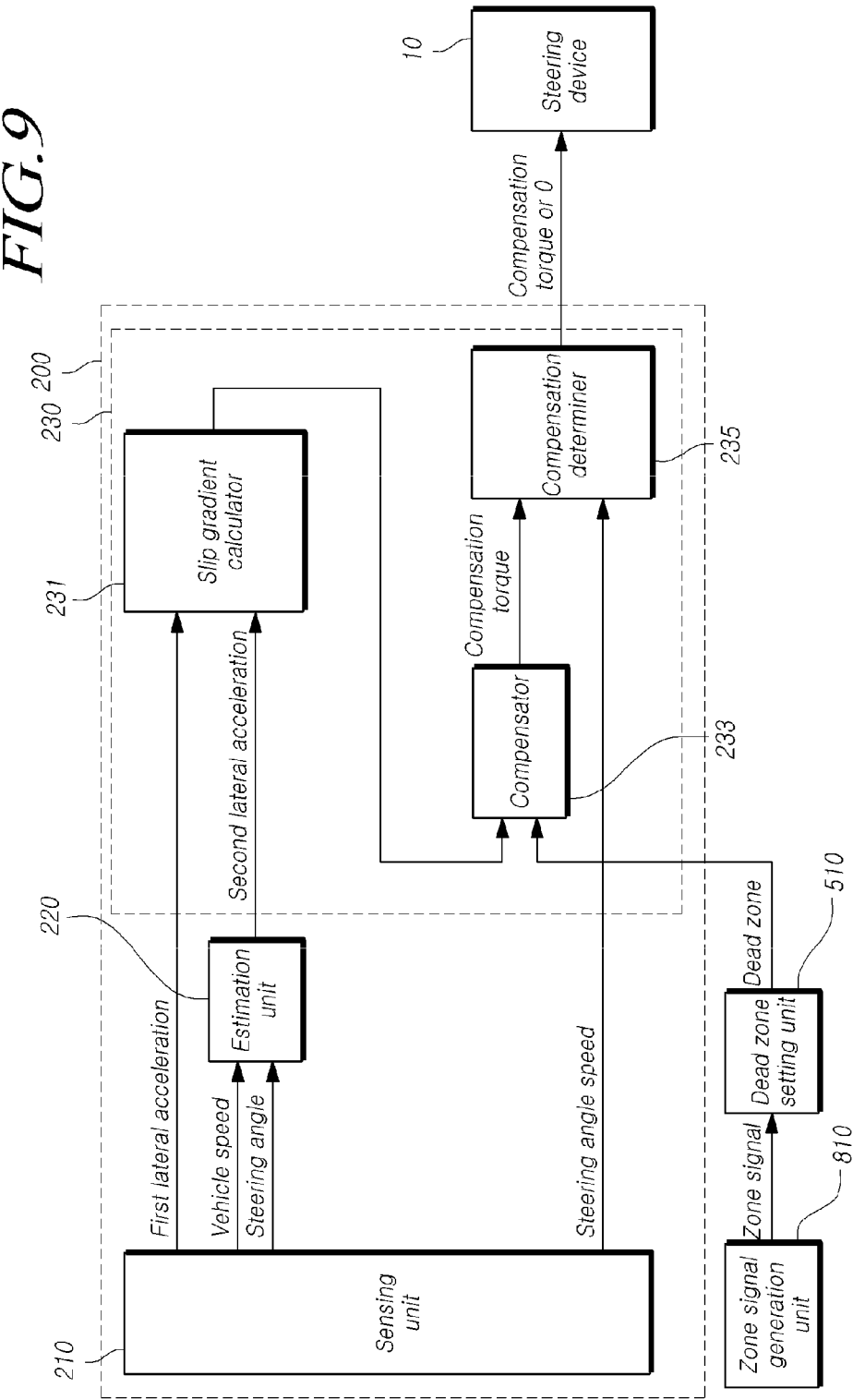
FIG. 9 illustrates one example for describing an operation of a steering control apparatus according to a third embodiment.
Figure 10:
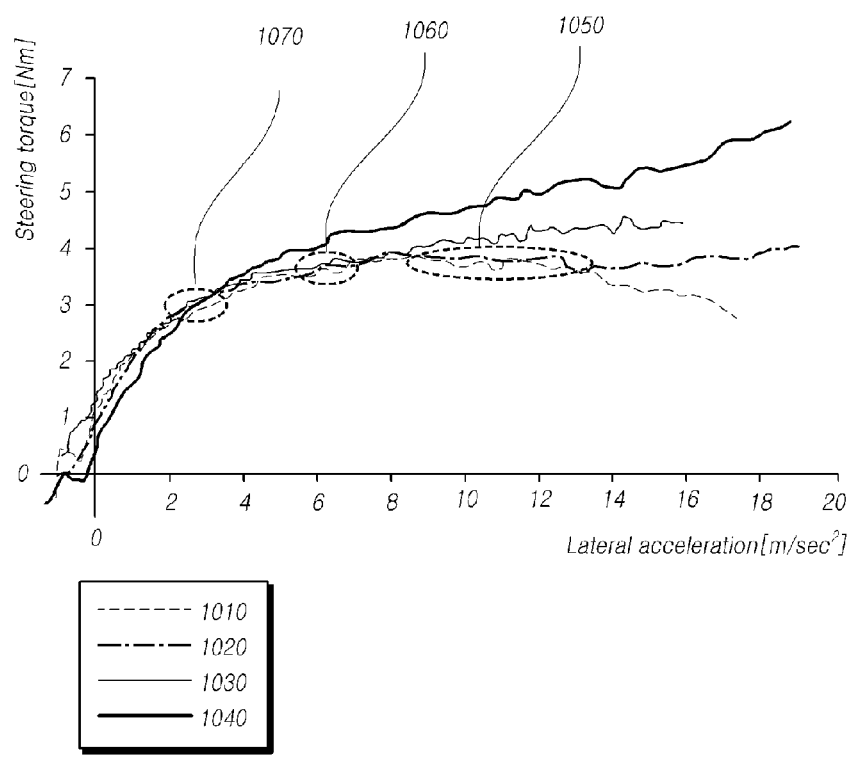
FIG. 10 illustrates one example for describing an operation of a controller according to a third embodiment.

FIG. 8 illustrates a configuration of a steering control apparatus according to a third embodiment; FIG. 9 illustrates one example for describing an operation of a steering control apparatus according to the third embodiment; and FIG. 10 illustrates one example for describing an operation of a controller according to the third embodiment.

Referring to FIG. 8, the steering control apparatus according to the third embodiment may further include: a zone signal generation unit 810 that generates at least one zone signal; and the dead zone setting unit 510 that sets a dead zone in which a value of a slip gradient is from 0 to a predetermined value based on the zone signal, in the steering control apparatus 200 according to the first embodiment. Therefore, the controller 230 may control the steering device so that a steering torque increases only when the slip gradient corresponds to a zone other than the dead zone.

The zone signal generation unit 810 may use any input device, such as a button-type input device or a rotatable input device, and may generate different gain signals according to inputs by the input device.

Referring to FIG. 9, in the steering control apparatus according to the third embodiment, the zone signal generation unit 810 may output a zone signal and the dead zone setting unit 510 may set a dead zone in which the slip gradient is from 0 to a predetermined value changed based on the output zone signal and then input the dead zone to the compensator 233 of the steering control apparatus 200 according to the first embodiment. Therefore, the compensator 233 may output a compensation torque that compensates for a slip gradient received from the slip gradient calculator 231 only when the slip gradient corresponds to a zone other than the dead zone.

Referring to FIG. 10, FIG. 10 illustrates one example of waveforms 1010, 1020, 1030, and 1040 indicating the relationship between steering torque and lateral acceleration in the cases in which the zone signal generation unit generates a first zone signal, a second zone signal, a third zone signal, and a fourth zone signal and the dead zone setting unit sets a first dead zone, a second dead zone, a third zone, and a fourth dead zone, respectively, according to the generated zone signals. The first dead zone may be a zone in which the slip gradient is from 0 [m/sec$^2$] to a first predetermined value based on the first zone signal; the second dead zone may be a zone in which the slip gradient is from 0 [m/sec$^2$] to a second predetermined value based on the second zone signal; the third dead zone may be a zone in which the slip gradient is from 0 [m/sec$^2$] to a third predetermined value based on the third zone signal; and the fourth dead zone may be a zone in which the slip gradient is from 0 [m/sec$^2$] to a fourth predetermined value based on the fourth zone signal.

At this time, the first, second, third, and fourth predetermined values may have a relationship corresponding to Equation 2 below.

First predetermined value>second predetermined value>third predetermined value>fourth predetermined value    [Equation 2]

In other words, the zone signal generation unit of the steering control apparatus according to the third embodiment may differently generate a first zone signal, a second zone signal, a third zone signal, and a fourth zone signal, thereby adjusting a steering torque which increases after one area 1050, another area 1060, and the other area 1070, on the basis of a slip gradient. The steering control apparatus according to the third embodiment can hereby set the steering torque to differently increase according to drivers.

For example, in the case of a strong driver, the zone signal generation unit of the steering control apparatus according to the third embodiment can generate the third zone signal (hence, a waveform 1030 is formed) or the fourth zone signal (hence, a waveform 1040 is formed) to prevent the strong driver from performing excessive steering. In contrast, in the case of a weak driver, the zone signal generation unit of the steering control apparatus according to the third embodiment can generate the first zone signal (hence, a waveform 1010 is formed) or the second zone signal (hence, a waveform 1020 is formed) to prevent the weak driver from performing excessive steering.

As another example, in the case of a skilled driver, the zone signal generation unit of the steering control apparatus according to the third embodiment can generate the first zone signal (hence, a waveform 1010 is formed) or the second zone signal (hence, a waveform 1020 is formed) to enable the skilled driver to have a feeling caused by the slipping of a tire. In contrast, in the case of an unskilled driver, the zone signal generation unit of the steering control apparatus according to the third embodiment can generate the third zone signal (hence, a waveform 1030 is formed) or the fourth zone signal (hence, a waveform 1040 is formed) to prevent the unskilled driver from having a feeling caused by the slipping of a tire.

As further example, in the case of a strong and skilled driver, the zone signal generation unit of the steering control apparatus according to the third embodiment can generate the second zone signal (hence, a waveform 1020 is formed). In contrast, in the case of a strong but unskilled driver, the zone signal generation unit of the steering control apparatus according to the third embodiment can generate the fourth zone signal (hence, a waveform 1040 is formed). Further, in the case of a weak but skilled driver, the zone signal generation unit of the steering control apparatus according to the third embodiment can generate the first zone signal (hence, a waveform 1010 is formed). Further, in the case of a weak and unskilled driver, the zone signal generation unit of the steering control apparatus according to the third embodiment can generate the third zone signal (hence, a waveform 1030 is formed).

Figure 11:
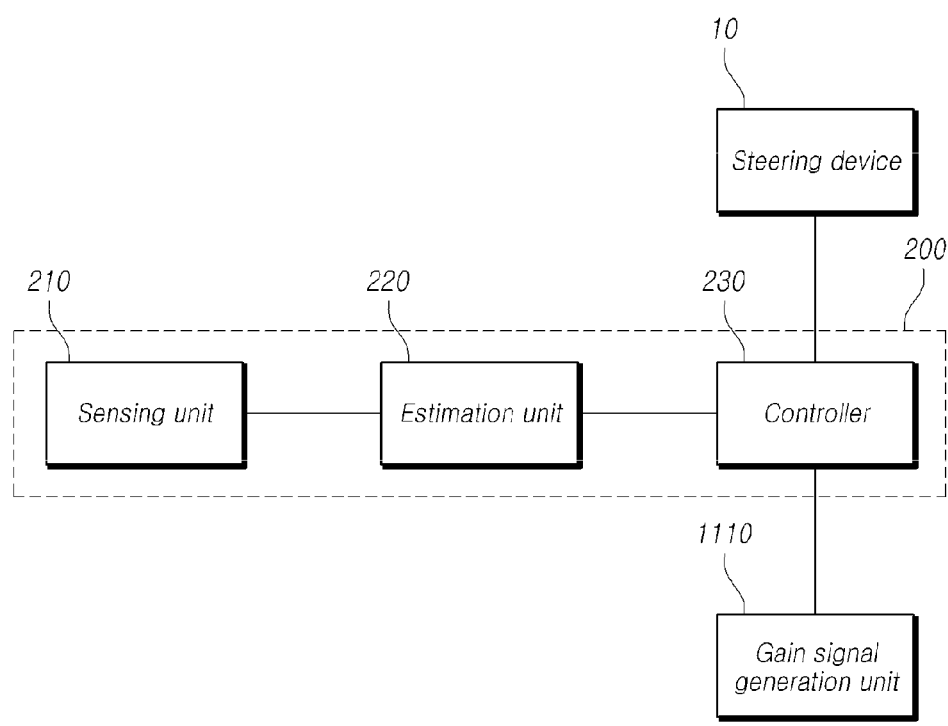
FIG. 11 illustrates a configuration of a steering control apparatus according to a fourth embodiment.
Figure 12:
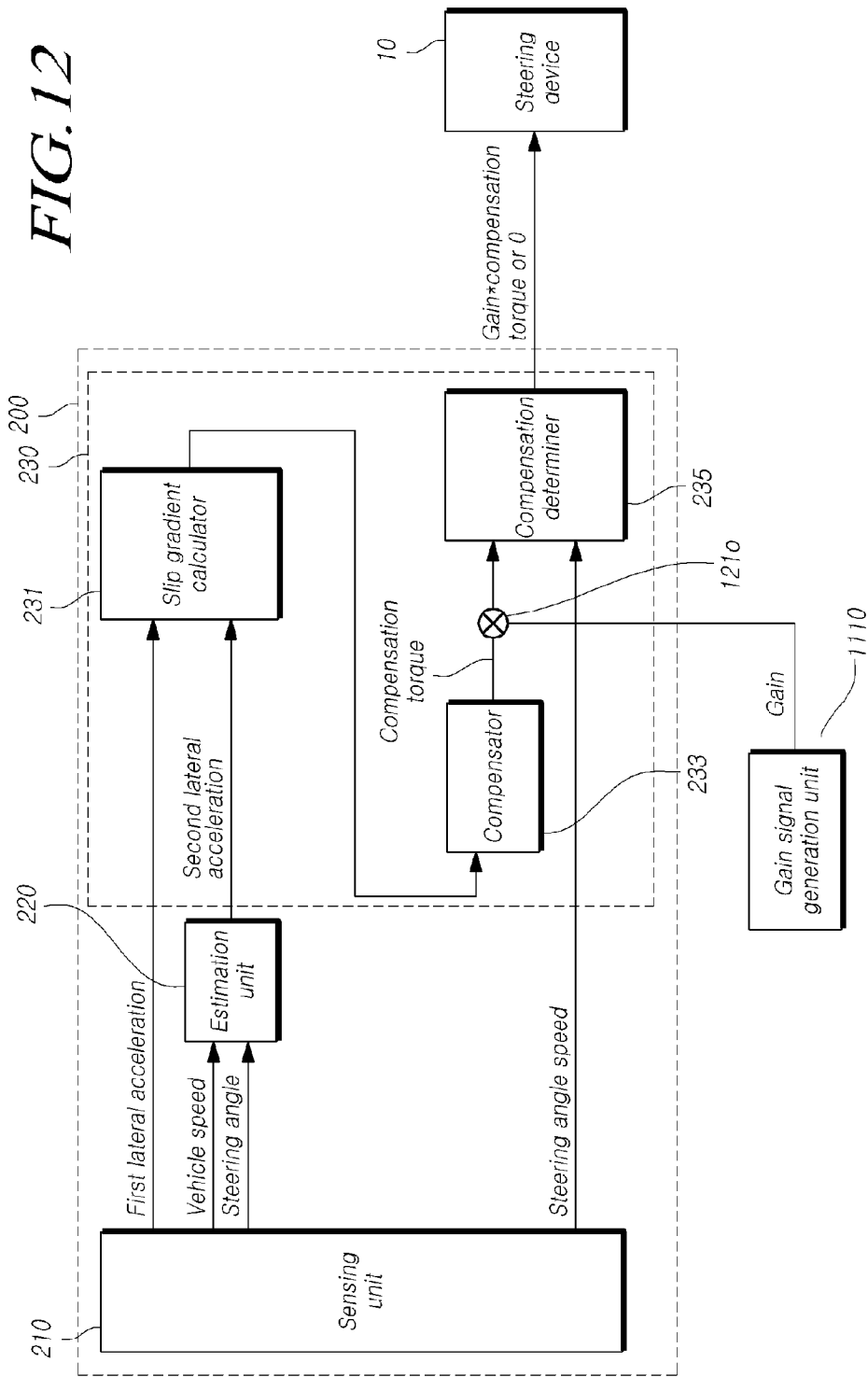
FIG. 12 illustrates one example for describing an operation of a steering control apparatus according to a fourth embodiment.
Figure 13:
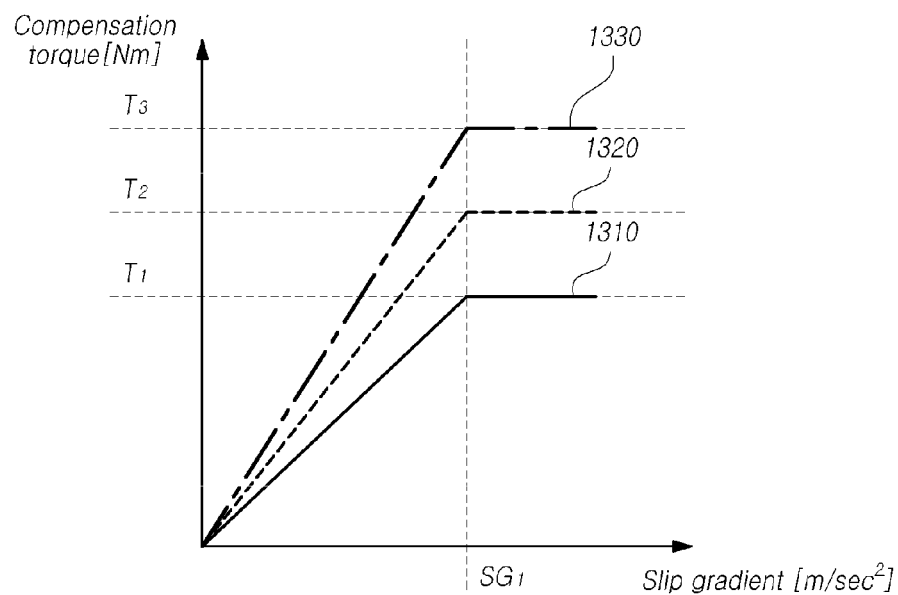
FIG. 13 illustrates one example for describing an operation of a controller according to a fourth embodiment.

FIG. 11 illustrates a configuration of a steering control apparatus according to a fourth embodiment; FIG. 12 illustrates one example for describing an operation of a steering control apparatus according to the fourth embodiment; and FIG. 13 illustrates one example for describing an operation of a controller according to the fourth embodiment.

Referring to FIG. 11, the steering control apparatus according to the fourth embodiment may further include a gain signal generation unit 1110, which generates at least one gain signal, in the steering control apparatus 200 according to the first embodiment. Therefore, the controller 230 may control the steering device 10 to change the amount of increase in a steering torque.

The gain signal generation unit 1110 may use any input device including a button-type input device or a rotatable input device, and may generate different gain signals according to inputs by the input device.

Referring to FIG. 12, in the steering control apparatus according to the fourth embodiment, the gain signal generation unit 1110 may output a gain and multiply, by the gain, a compensation torque output by the compensator 233 of the controller 230 (1210). Therefore, the steering device 10 may receive an input of 0 or a value by multiplying the gain and the compensation torque and then change the amount of the increase in the steering torque.

Referring to FIG. 13, FIG. 13 illustrates compensation torques 1310, 1320, and 1330 related to slip gradients according to cases in which the gain signal generation unit generates a first gain signal, a second gain signal, and a third gain signal, respectively.

At this time, a first gain, a second gain, and a third gain may have a relationship corresponding to Equation 3 below.

First gain<second gain<third gain [Equation 3]

A first compensation torque $T_1$, a second compensation torque $T_2$, and a third compensation torque $T_3$ according to a first slip gradient $SG_1$ may be determined according to the first gain, the second gain, and the third gain, respectively.

For example, when the third gain is twice the size of the first gain, the third compensation torque $T_3$ may be twice the size of the compensation torque $T_1$.

By performing the above-described operation, the steering control apparatus according to the fourth embodiment may input a compensation torque to the steering device to adjust the amount of increase in a steering torque for a slip gradient.

Hereinafter, description will be briefly given of a steering control method which is an operation performed by the steering control apparatus described using FIGS. 1 to 13.

Figure 14:
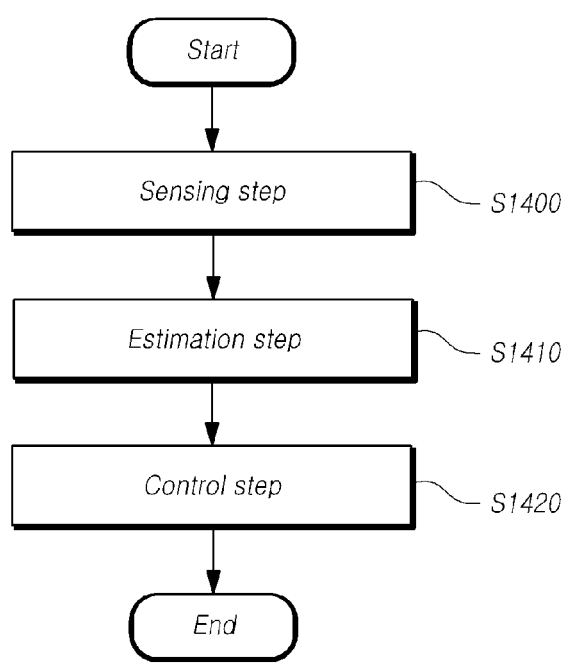
FIG. 14 illustrates a flowchart of a steering control method according to one embodiment.

FIG. 14 illustrates a flowchart of a steering control method according to one embodiment.

Referring to FIG. 14, a steering control method according to one embodiment may include: a sensing step (S1400) of sensing at least one among a vehicle speed, a steering angle, first lateral acceleration, and a steering angle speed; an estimation step (S1410) of estimating second lateral acceleration on the basis of the vehicle speed and the steering angle; and a control step (S1420) of controlling a steering device so that a steering torque increases, on the basis of a slip gradient which indicates a difference between the first lateral acceleration and the second lateral acceleration, wherein the controlling of the steering device is released when the steering angle speed is inverted.

In the sensing step (S1400), the steering control apparatus may sense, using at least one sensor installed in a vehicle, a vehicle speed which is the moving speed of the vehicle, a steering angle formed by a steering device operated by a driver and a steering angle speed according thereto, and first lateral acceleration which is lateral acceleration acting on a cornering vehicle.

In the estimation step (S1410), the steering control apparatus may estimate second lateral acceleration by applying the vehicle speed and the steering angle, which have been sensed in the sensing step (S1400), to the above-described Equation 1 which is a cornering equation of a bicycle model.

In the control step (S1420), the steering control apparatus may define, as a slip gradient, a difference between the first lateral acceleration sensed in the sensing step (S1400) and the second lateral acceleration estimated in the estimation step (S1410) and control a steering device so that a steering torque increases, on the basis of the slip gradient, wherein the steering control apparatus may release the controlling of the steering device when the steering angle speed sensed in the sensing step 1400 is inverted (changed from a positive value to a negative value or changed from a negative value to a positive value).

The steering torque may mean a torque required to operate the steering device. Therefore, in the control step (S1420), the steering control apparatus may output a compensation torque proportionate to the slip gradient to control the steering device 10 so that the steering torque increases, thereby limiting the increase of the steering angle.

The slip gradient means a value corresponding to the slip angle described in FIG. 1A, and limiting the increase of the steering angle by the controller 230 may be for the purpose of limiting the increase of a slip angle to maintain a self-aligning torque in FIG. 1B.

The control step (S1420) of the above-described steering control method according to one embodiment may further include a dead zone setting step of setting a dead zone in which the slip gradient which indicates a difference between the first lateral acceleration and the second lateral acceleration is from 0 to a predetermined value. Therefore, in the control step (S1420), the steering control apparatus may control the steering device so that the steering torque increases only when the slip gradient is larger than the predetermined value which is the maximum value of the dead zone.

Further, the control step (S1420) of the above-described steering control method according to one embodiment may further include: a zone signal generation step of generating at least one zone signal; and a dead zone setting step of setting a dead zone in which the value of the slip gradient is from 0 to a predetermined value based on the generated zone signal. Therefore, in the control step (S1420), the steering control apparatus may control the steering device so that the steering torque increases only when the slip gradient corresponds to a zone other than the dead zone. Thanks to this function, the steering control apparatus can set the steering torque to differently increase according to drivers.

Further, the control step (S1420) of the above-described steering control method according to one embodiment may further include a gain signal generation step of generating at least one gain signal. Therefore, in the control step (S1420), the steering control apparatus may control the steering device to change the amount of increase in the steering torque according to the gain signal.

In addition, the steering control method may perform all operations performed by the steering control apparatus described on the basis of FIGS. 1 to 13.

Even when all the elements constituting an embodiment have been described above as being combined into a single unit or combined to be operated as a single unit, the present invention is not necessarily limited to such an embodiment. That is, at least two elements of all structural elements may be selectively combined and operate without departing from the scope of the present embodiments. The above description have been made merely for the purpose of illustrating the technical idea of the present embodiments, and a person skilled in the art will appreciate that various modifications and changes are possible without departing from the scope and spirit of the present invention. The protection scope of the present embodiments shall be construed on the basis of the accompanying claims in such a manner that all of the technical ideas included within the scope equivalent to the claims belong to the present invention.

What is claimed is:

1. A steering control apparatus comprising:
    a sensing unit configured to sense a vehicle speed, a steering angle, first lateral acceleration, and a steering angle speed;
    an estimation unit configured to estimate second lateral acceleration on the basis of the vehicle speed and the steering angle;
    a controller configured to
        control a steering device to thereby increase a steering torque on the basis of a slip gradient which indicates a difference between the first lateral acceleration and the second lateral acceleration, and
        release the controlling of the steering device when the steering angle speed is inverted, and
    a dead zone setting unit configured to set a dead zone in which the slip gradient is set to have a value from 0 to a predetermined value,
        wherein the controller controls the steering device so that the steering torque increases only when the slip gradient corresponds to a zone other than the dead zone.

2. The steering control apparatus of claim 1, wherein the controller outputs a compensation torque, which is proportionate to the slip gradient, to control the steering device so that the steering torque increases, thereby limiting the increase of the steering angle.

3. The steering control apparatus of claim 1, wherein the estimation unit estimates the second lateral acceleration, using a cornering equation of a bicycle model.

4. The steering control apparatus of claim 1, further comprising a zone signal generation unit configured to generate at least one zone signal, wherein the dead zone setting unit changes the predetermined value on the basis of the zone signal.

5. The steering control apparatus of claim 1, further comprising a gain signal generation unit configured to generate at least one gain signal, wherein the controller multiplies a compensation torque for the slip gradient by the gain signal to adjust the amount of increase in the steering torque.

6. A steering control method, comprising:
    sensing a vehicle speed, a steering angle, first lateral acceleration, and a steering angle speed;
    estimating second lateral acceleration on the basis of the vehicle speed and the steering angle;
    controlling a steering device to thereby increase a steering torque on the basis of a slip gradient which indicates a difference between the first lateral acceleration and the second lateral acceleration;
    releasing the controlling of the steering device when the steering angle speed is inverted; and,
    setting a dead zone in which the slip gradient is set to have a value from 0 to a predetermined value, wherein, in the controlling of the steering device, the slip gradient is compensated only when the slip gradient corresponds to a zone other than the dead zone.

7. The steering control method of claim 6, further comprising generating at least one zone signal, wherein, in the setting of the dead zone, the predetermined value is changed on the basis of the zone signal.

8. The steering control method of claim 6, further comprising generating at least one gain signal, wherein, in the controlling of the steering device, the amount of an increase in the steering torque is adjusted by multiplying a compensation value for the slip gradient by the gain signal.

* * * * *